UNITED STATES PATENT [11] 3,629,849

[72] Inventor Jacques Sauvan
Paris, France

[21] Appl. No. 32,334
[22] Filed Apr. 27, 1970
[45] Patented Dec. 21, 1971
[73] Assignee Societe Nationale D'Etude et de Construction de Moteurs D'Aviation S.N.E.C.M.A.
Paris, France
[32] Priority Apr. 28, 1966
[33] France
[31] 59.440
Continuation-in-part of application Ser. No. 634,387, Apr. 27, 1967, now abandoned. This application Apr. 27, 1970, Ser. No. 32,334

[54] PATTERN RECOGNITION, AND PARTICULARLY DETERMINATION OF HOMOMORPHY BETWEEN VECTOR SYSTEMS FORMING INTERRELATED STRUCTURES

36 Claims, 20 Drawing Figs.

[52] U.S. Cl. 340/172.5
[51] Int. Cl. G06f 7/02, G06g 7/28, G11b 13/00
[50] Field of Search 340/172.5

[56] References Cited
UNITED STATES PATENTS

| | | | |
|---|---|---|---|
| 3,038,660 | 6/1962 | Honnell et al. | 235/180 |
| 3,191,150 | 6/1965 | Andrews | 340/146.3 |
| 3,242,466 | 6/1966 | Dirks | 340/172.5 |
| 3,278,899 | 10/1966 | Shelton et al. | 340/146.3 |
| 3,297,993 | 1/1967 | Clapper | 340/146.3 |
| 3,309,674 | 3/1967 | Lemay | 340/172.5 |
| 3,391,392 | 7/1968 | Doyle | 340/172.5 |
| 3,394,352 | 7/1968 | Wernikoff et al. | 340/172.5 |
| 3,411,140 | 11/1968 | Halina et al. | 340/172.5 |
| 3,440,617 | 4/1969 | Lesti | 340/172.5 |
| 3,446,950 | 5/1969 | King et al. | 235/197 |

*Primary Examiner*—Raulfe B. Zache
*Assistant Examiner*—Ronald F. Chapuran
*Attorney*—Flynn & Frishauf ABSTRACT: A pattern is represented by vectors in a coordinate system. A matrix, forming an electrical analog of a vector, or point units within the matrix, is constructed, signals representative of the direction of the vectors of a second vector group (structure) are then generated and sequentially applied to the matrix; upon noncoincidence of the signal representative of change of orientation of the vector traversing the circuit, further comparison is stopped and the state of the circuit is stored, so that an indication of similarity of a structure, as represented by the signals with another structure, as represented by the circuit is obtained, to the extent that such a similarity exists. In a modification, fictitious signals may be generated to provide continuity for noncontinuous vector quantities or to simulate specific problems.

INVENTOR
JACQUES SAUVAN
By: Stephen A. Fershany
Atty

PATTERN RECOGNITION, AND PARTICULARLY DETERMINATION OF HOMOMORPHY BETWEEN VECTOR SYSTEMS FORMING INTERRELATED STRUCTURES

This application is a continuation-in-part of Ser. No. 634,387, filed Apr. 27, 1967, now abandoned.

The present invention relates generally to pattern recognition and comparison, and more particularly to the identification of the homomorphy between structures represented by vectors, or vector groups, or systems.

Homomorphy between two structures exists when a complex system includes within itself a system which is isomorphic with a simpler system. Two systems are isomorphic when the structures of the system correspond directly, or reversely. Thus, homomorphy can be defined as similarity of form, appearance, shape, or size. In the context of the present invention it includes the concept of a symbolic map, or display between two sets of vector representations—in space—, or elements in which correspondence of relationships between the elements of the sets is to be determined.

The term "structure" as used herein means any form or pattern which may be represented by an assembly of points or vectors located in a two, or more, dimensional space.

The present invention relates to methods and systems solving the following general problem:

Given two assemblies or groups of vectors or points which can be located with respect either to a reference system (or to two reference systems having a defined law of correspondence), is or are there, in one of the assemblies, one or more subunits corresponding to the other assembly:

The invention can be used to recognize shapes such as drawings, typed or printed characters, finger prints, photographs etc., and the solution of complex problems of the documentary identification type, in which the elements of the problems can be represented in the form of graphs or assemblies of points to be interconnected by vectors.

SUBJECT MATTER OF THE INVENTION

Briefly, the similarities between patterns which can be transformed into vector systems are compared by establishing, first, in a matrix of logic elements, an analog of the first vector system; this is done by changing the state of circuit elements, for example by setting circuits corresponding to vectors into a ONE state and those within the matrix which do not correspond, to a ZERO state. Thereafter, to all, or selected ones of nodal points of the matrix, signals are applied indicative of an angular change in orientation between successive vectors in the vector path of the second vector system. Those signals which represent a change in orientation and are applied to an element in a ONE state will propagate; those which are applied to an element in a ZERO state will be blocked. Passage of the signals through the elements can be detected, stored, and subsequently read out; those of the circuits which passed signals then are indicative of vectors in which a correspondence between the second, and the first vector system existed.

The invention will be described by way of example with reference to the accompanying drawings, wherein.

Figure 1:
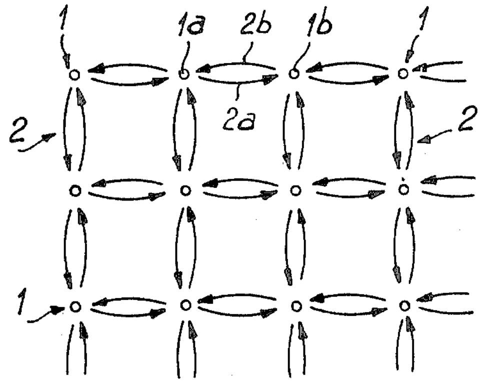
FIG. 1 shows a basic reference system.

FIG. 1 shows a two dimensional matrix comprising nodal points 1, 1*a*, 1*b* coupled by vectors 2, 2*a*, 2*b*, each defining a particular direction; for example vector 2*a* leads from nodal point 1*a* to nodal point 1*b* while the vector 2*b* leads from nodal point 1*b* to nodal point 1*a*.

Figure 2:
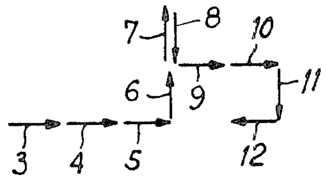
FIG. 2 shows a succession of vectors representing a unit comprising a continuous path.

FIG. 2 is a vectorial representation of a particular shape and comprises vectors 3 to 12, each having the same length and one of four different directions corresponding to the four possible directions of vectors 2 in the matrix of FIG. 1. The vectors 3 to 12 form an uninterrupted series from the beginning of vector 3 to the end of vector 12. Thus one passes from vector 3 to vector 4 without changing direction; similarly from vector 4 to vector 5 but from vector 5 to vector 6 there is a change in direction of 90°. From vector 6 to vector 7 there is no change in direction but a change in direction of 180° from vector 7 to vector 8 and a further change of 90° from vector 8 to vector 9. From vector 9 to vector 10 there is no change in direction but a change in direction of 90° from vector 10 to vector 11 and a further change of 90° from vector 11 to vector 12.

The shape defined by this succession of vectors may thus be reproduced in the matrix of FIG. 1 by a similar succession of vectors having a direction corresponding to those in FIG. 2.

Figure 3:
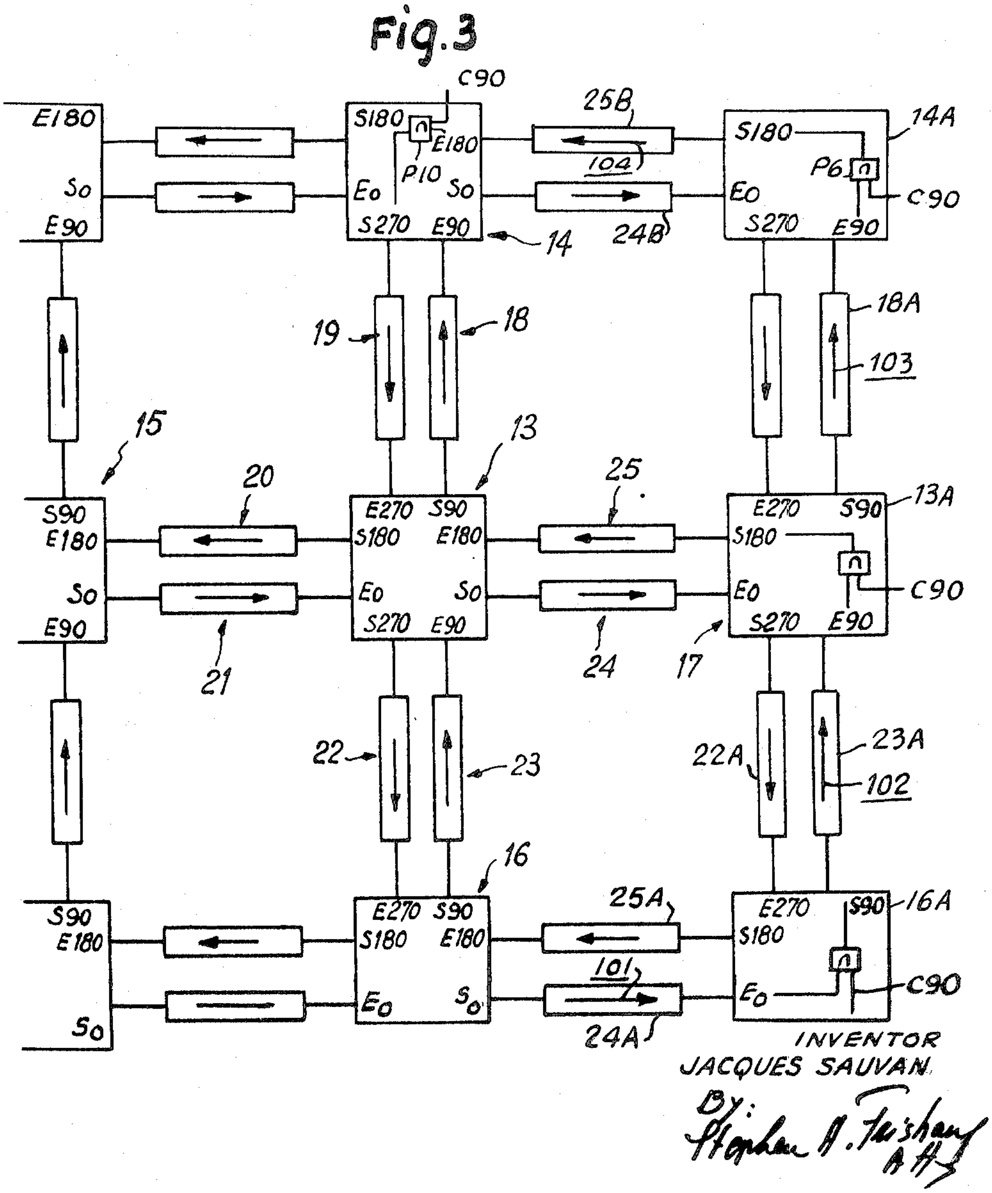
FIG. 3 shows a matrix including logic circuits and vector elements, the matrix corresponding to the frame of FIG. 1.
Figure 10:
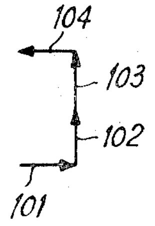
FIGS. 10 and 11 show the two vector units A and B between which a correspondence is to be established.
Figure 11:
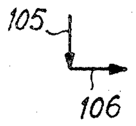

FIG. 3 shows a matrix in block schematic form for storing a vectorial representation such as that shown in FIG. 10 and referred to as unit A to enable a correspondence, if any, to be established between the stored vectorial representation and another vectorial representation such as that shown in FIG. 11 and referred to as unit B.

The nodal points 1 in FIG. 1 are represented by the logic circuits 13, 13A, 14, 14A, 15, 16 and 16A and the vectors 2 connecting the nodal points are represented by vector elements 18, 18A, 19, 19A, 20, 21, 22, 22A, 23, 23A, 24, 24A, 24B, 25, 25A and 25B. As will be seen in FIG. 3, to each logic circuit there are connected pairs of vector elements, each element being arranged to pass a signal representing a vector from one logic circuit to another. The beginning of a vector is represented by S (start) and the end by E (end), which correspond to the output from one logic circuit and the input to a different logic circuit respectively.

By taking the positive *x*-axis for example as the reference axis corresponding to an orientation of 0°, the vector element 21 is parallel to the reference axis and of the same sense, and has its output connected to the input $E_0$ of the logic circuit 13 and its input connected to the output $S_0$ of the logic circuit 15. The vector element 24, which is parallel to the vector element 21, has its input connected to the output $S_0$ of the logic circuit 13 and its output connected to the input $E_0$ of the logic circuit 17. The vector element 18, at an angle of 90° to the vector element 24, has its input connected to the output $S_{90}$ of the logic circuit 13 and its output connected to the input $E_{90}$ of the logic circuit 14, and so on.

Each logic circuit, such as circuit 13, FIG. 3, includes (see FIG. 4) a plurality of AND gates P1 to P16. The gates are grouped in four rows, each row having four gates, one input of each of the gates in the first row being connected to the input terminal $E_O$ of the logic circuit, and one input terminal of each of the gates in subsequent rows are connected respectively to the $E_{90}$, $E_{180}$ and $E_{270}$ terminals.

The other inputs of the gates $P_1$ to $P_{16}$ are connected by columns to common terminals $C_O$, $C_{90}$, $C_{180}$ and $C_{270}$. These terminals are connected to a clock delivering control signal $T_2$.

The outputs of the gates $P_1$, $P_8$, $P_{11}$ and $P_{14}$ are connected to the terminal $S_O$. The outputs of the gates $P_2$, $P_5$, $P_{12}$ and $P_{15}$ are connected to the terminal $S_{90}$; the outputs of the gates $P_3$, $P_6$, $P_9$ and $P_{16}$ are connected to the terminal $S_{180}$; and the outputs of the gates $P_4$, $P_7$, $P_{10}$ and $P_{13}$ are connected to the terminal $S_{270}$.

The vector elements connecting the logic circuits shown in FIG. 3 each comprise (see FIG. 5) bistable circuits $B_1$ and $B_2$ connected together over an AND gate P. Each bistable circuit is set by a signal applied to the input to provide a signal on the output. A signal applied to terminal 26 of bistable circuit $B_1$ resets the circuit to ZERO and removes the signal from the output. A signal applied to terminal 29 of bistable circuit $B_2$ sets the circuit to the ONE state. Inhibiting signals applied to terminal 30 of bistable circuit $B_2$ result in the circuit remaining in or returning to its reset or ZERO state whether or not a signal is applied to its input or to terminal 29. Terminal 27 of AND gate P is a control signal input whose function will be described with reference to FIG. 7.

Figure 6:
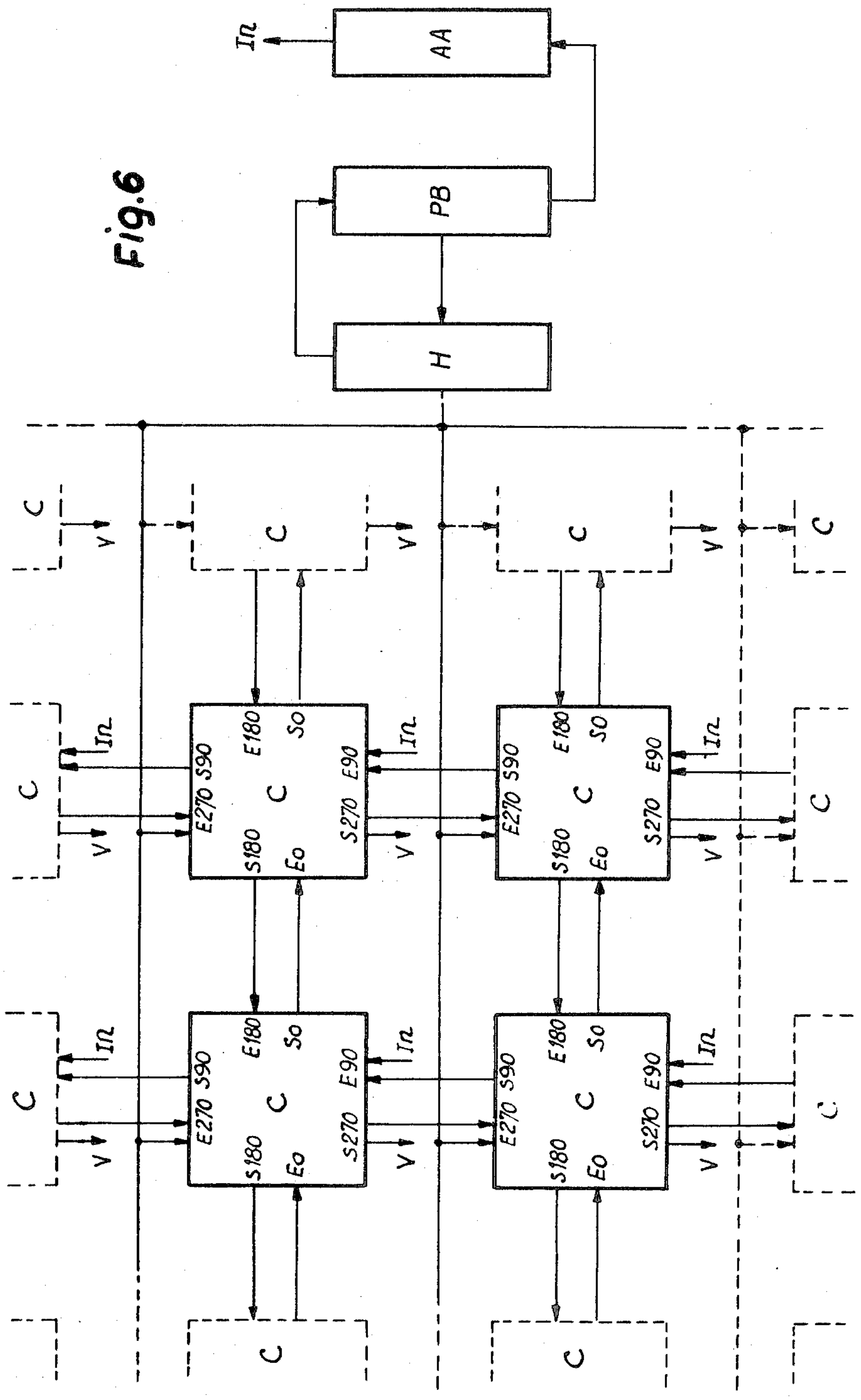
FIG. 6 shows an identification device incorporating part of the matrix shown in FIG. 3.

The block schematic circuit of FIG. 6 is similar to that of FIG. 3; it further includes a clock H for controlling the operation of the matrix; a programmer PB whose function is to store information defining a vectorial representation which is to be compared (unit B of FIG. 11) and thereby identified with a vectorial representation stored in the matrix (unit A of FIG. 10) and subsequently to apply the stored signals to the matrix; and an input-output unit AA which presents to the matrix the information defining the vectorial representation to be stored therein and, if desired, displays or prints out the information and data handled by unit AA. Readout terminals V are provided by each logic circuit and inhibition inputs $I_n$ are provided for the application of inhibition signals as will be described with reference to FIG. 7.

The input-output-display unit AA stores the information relative to the larger system, i.e., unit A to be subsequently presented to the matrix, or it can feed in the information directly. It may be, for example, a punched tape or card reader; direct feeding of the information to the matrix may be accomplished by a matrix of photoelectric cells sensing holes in a punched card, the holes being positioned in accordance with the coordinates of the beginning and end of each vector of the vectorial representation that is to be stored in the matrix of logic circuits.

The programmer PB stores information relative to the smaller system, i.e. unit B to be compared with the unit A stored in the matrix, concerning the number and orientation of vectors in the vectorial representation and also information as to the change in orientation of one vector relative to the immediately preceding one; in other words, the unit PB here termed the programmer PB records the data pertaining to unit B and controls clock H to successively control the logic network in accordance with change of orientation of the vectors stored in unit PB.

Figure 7:
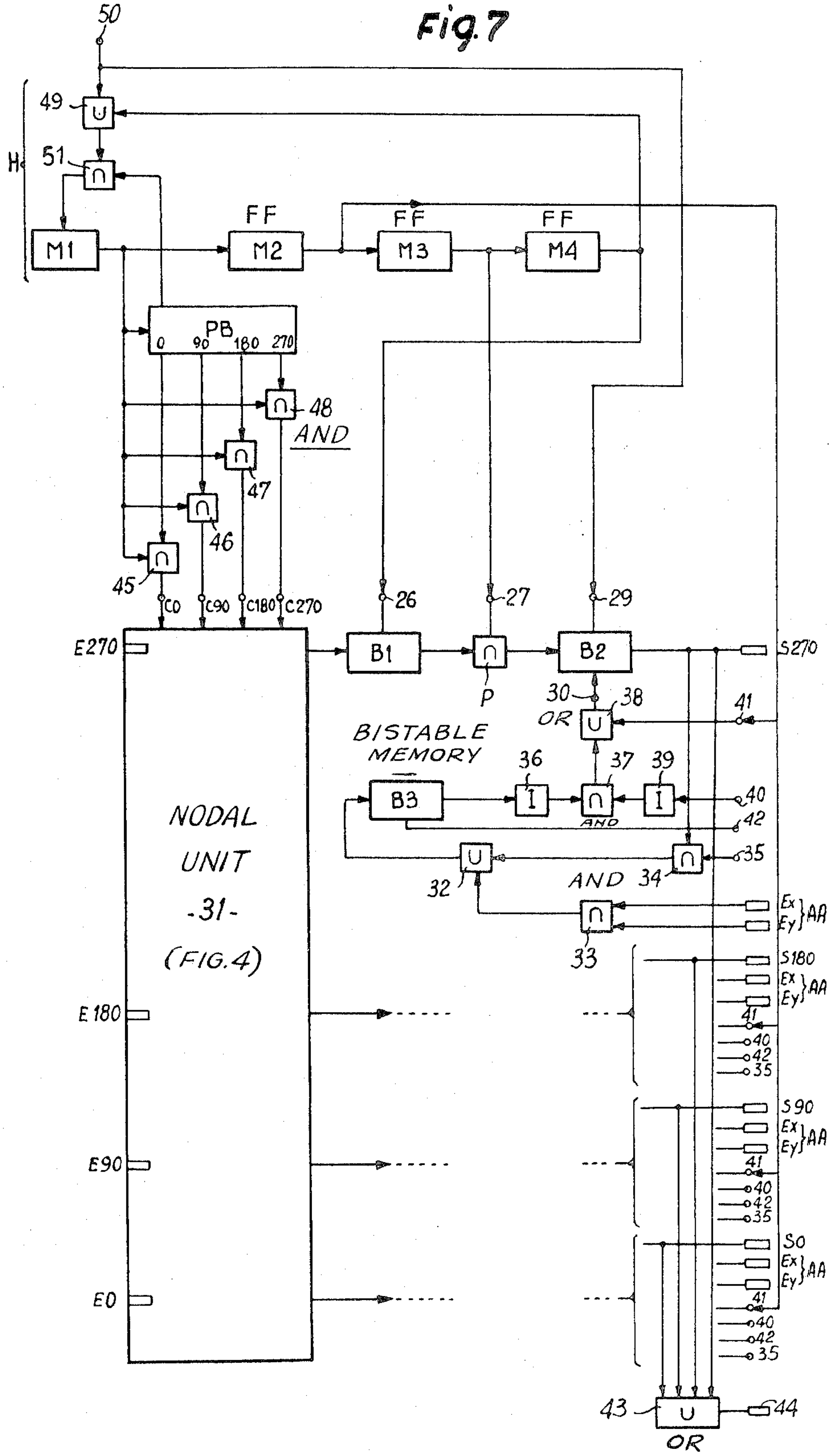
FIG. 7 shows a logic diagram of part of the device of FIG. 6.

Referring now to FIG. 7, there is shown in more detail one of the logic circuits of FIG. 3, one of the vector elements and the associated circuits included in the clock H, and the appropriate circuits of programmer PB and input-output-display unit AA. Logic circuit 31 represents a nodal point, e.g., 13 (FIG. 3).

The part of the input-output unit AA shown includes a bistable memory element $B_3$ which has its input connected to a logic "OR"-gate 32, the two inputs of which are connected to two logic "AND"-gates 33 and 34. The two inputs $E_x$ and $E_y$ of the AND-gate 33 are the terminals of the input-output-display device AA; the two inputs of the AND-gate 34 are connected, one to an extension terminal 35 and the other to the output of the bistable circuit $B_2$ forming part of the vector element coupling the logic circuit 31 to an adjacent logic circuit (not shown in FIG. 7) by the terminal $S_{270}$. The output of the bistable memory element $B_3$ is connected to the input 30 of the bistable circuit $B_2$ by an inverter 36, an AND-gate 37 and an OR-gate 38. The second input of the AND-gate 37 is connected by a second inverter 39 to a generalization terminal 40 connected to the programmer PB; the second input of the OR-gate 38 is connected to a terminal 41 for resetting the bistable circuit $B_2$. The bistable memory element $B_3$ includes a terminal 42 for the application thereto of a reset signal.

With the other three vector elements whose inputs are connected to respective ones of the outputs $S_0$, $S_{90}$ and $S_{180}$, there are associated in the same manner identical circuit elements, each bistable circuit $B_2$ of these vector elements being controllable by a bistable memory element $B_3$.

The output of each vector element is connected to an input of an OR-gate 43 whose output is connected to a readout terminal 44.

The clock H comprises four monostable trigger circuits $M_1$ to $M_4$ connected in series. The trigger circuit $M_1$ has its input connected to the programmer PB through an AND-gate 51; its output is connected to the programmer PB, to the trigger circuit $M_2$, and to an input of each of the four AND-gates 45 to 48. The AND-gates 45 to 48 have their second input connected to the programmer PB and their output connected respectively to the inputs $C_O$, $C_{90}$, $C_{180}$, and $C_{270}$ of the AND-gates shown in FIG. 4 which comprise the logic circuits in the matrix of FIGS. 3 and 6.

The output of the trigger circuit $M_2$ is connected to the trigger circuit $M_3$ and to the inputs 41 for resetting the bistable circuits $B_2$ of the vector elements.

The output of the trigger circuit $M_3$ is connected to the trigger circuit $M_4$ and to the control terminals 27 of the gates P of all the group of vector elements associated with the outputs $S_O$, $S_{90}$, $S_{180}$ and $S_{270}$ of the logic circuit 31.

Finally, the trigger circuit $M_4$ has its output connected to the inputs 26 of the aforementioned group of vector elements for resetting the bistable circuits $B_1$ of those vector elements and to an OR-gate 49 whose second input is connected to a start terminal 50 for setting the entire system into operation, and whose output feeds a second input of the AND-gate 51; the input 50 is also connected to the inputs 29, for resetting the bistable circuits $B_2$ of the aforementioned group of vector elements so that all bistable circuits $B_2$ will be at ZERO, or reset state, at the start of operations.

To establish a correspondence between the vectorial representation A shown in FIG. 10 and a less complex vectorial representation B shown in FIG. 11, that is to say to determine, if the representation B is the same as A, or in other words, if A includes B, it is necessary firstly to set up a pattern of energization in the matrix corresponding to the vectorial representation A and secondly to compare the vectorial representation B with the pattern of energization in the matrix.

The first step is accomplished by inhibiting all the bistable circuits $B_2$ in each vector element of the matrix that has no counterpart in the vector representation A. (Normally, all the bistable circuits $B_2$ are in a reset state which provides no signal at the output of the unit $B_2$). This is effected by the input-output-display device AA applying signals to the terminals $E_x$, $E_y$ (FIG. 7). This causes AND-gate 33 to provide an output signal to OR-circuit 32 which passes the signal on to set bistable circuit $B_3$. $B_3$, on being set, provides a ONE output signal which is inverted by the inverter 36 to a ZERO output signal. Since there is no signal on terminal 40, inverter circuit 39 provides a ONE output signal to AND-gate 37 which results in no inhibiting signal being applied to bistable circuit $B_2$ at terminal 30 over OR-gate 38. Circuit $B_2$ is thus free to change state.

If no signals are applied to the terminals $E_X$ or $E_Y$, that is, if one or more particular nodal points or vector elements emanating therefrom, are not part of the vector unit A (FIG. 10), bistable circuit $B_3$ is not set and the inverter 36 provides a ONE output signal. AND-gate 37, having both inputs energized by ONE signals causes a signal to be applied to terminal 30 of the bistable circuit $B_2$ over OR-gate 38 to inhibit circuit $B_2$ from being set. These inhibition signals on terminal 30 are maintained during the comparison cycle that follows after information relating to the vectorial representation B has been fed to the programmer PB.

SEQUENCE OF SIGNALS, AND COMPARISON CYCLE

Figure 12:
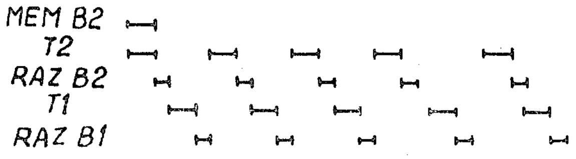
FIG. 12 shows the relative timing of signals controlling the sequential descriptions of the paths defined by the succession of vectors of unit B.

See FIG. 7, and timing diagram FIG. 12. The comparison cycle is initiated by a start signal (MEM $B_2$ FIG. 12) applied to terminal 50 (FIG. 7) which is coupled via terminals 29 to all the bistable circuits $B_2$ in the matrix. Those circuits $B_2$ which are not inhibited (signal on terminal 30) will be set. Signals are developed in response to the start signal (terminal 50) being applied to the clock H which cyclically supplies a series of four successive signals $T_2$, RAZ $B_2$, $T_1$ and RAZ $B_1$, see FIG. 12. Trigger circuit $M_1$ of the clock H is set by a signal applied via OR-gate 49 and AND-gate 51 which receives a signal from the unit PB. Circuit $M_1$ then supplies the signal $T_2$ to the programmer PB and to one input of each of the AND-gates 45 to 48. If there is a change in direction of 90° between the first two successive vectors of unit B, as recorded in programmer PB, as in the vectorial representation of FIG. 11, the programmer (having this information stored therein) causes a signal to issue from the output terminal 90 (in the example of FIG. 11) which energizes the other input of AND-gate 46 thus providing a signal to the $C_{90}$ column of every logic circuit 31 in the matrix.

Figure 4:
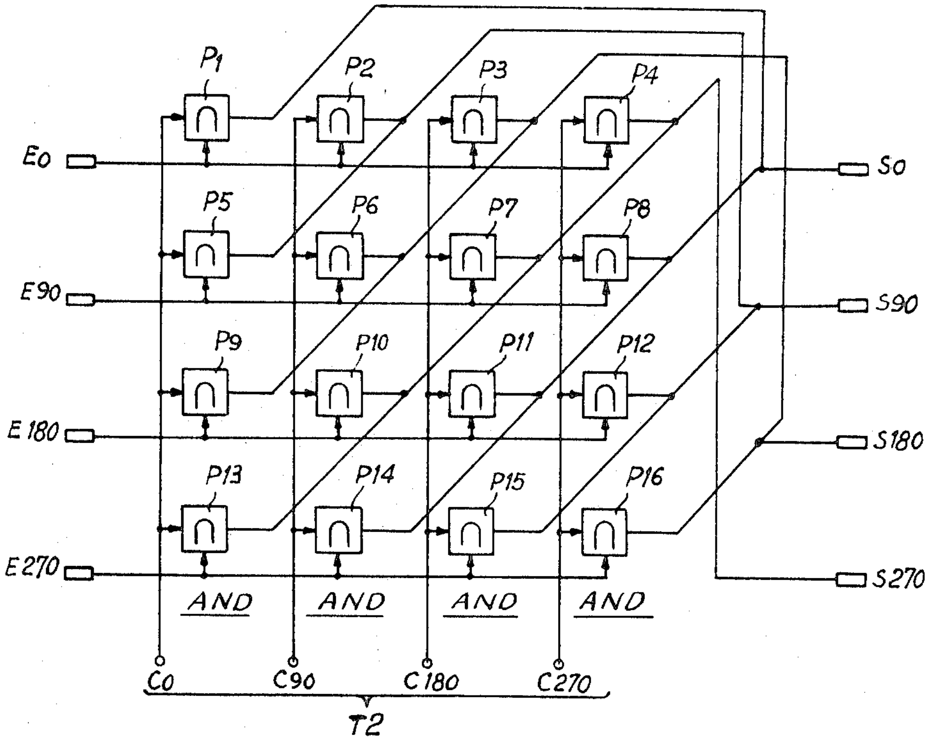
FIG. 4 shows the components and their interconnection of the logic elements included in the matrix of FIG. 3.

Referring now to FIG. 4, it will be seen that application of a signal to the $C_{90}$ column produces a signal on the particular output of the group of terminals $S_O$, $S_{90}$, $S_{180}$ or $S_{270}$ which rotates the vectorial relation represented by the input by 90°. Thus, whenever a signal is applied to one of the inputs which is coupled to a vector element which is set and connected to represent a vector having an angle as determined by the "C" input with respect to the vector represented by the E input, the particular S terminal will be energized which represents the E-vector as rotated. Thus, when the $C_{90}$ terminal is energized a signal applied to the $E_O$ input will produce a signal at the $S_{90}$ output, a signal applied to the $E_{90}$ input will produce a signal at the $S_{180}$ output, a signal applied to the $E_{180}$ input will produce a signal at the $S_O$ output.

Reference to FIGS. 3, 4 and 7 will illustrate propagation of the setting, assuming terminal $C_{90}$ (FIGS. 4 and 7) to be energized, indicative of a single right-angle change of direction of the vector 106 with respect to vector 105—see FIG. 11.

Assume the $E_0$ input of logic circuit 16A to be energized by the output of the bistable circuit $B_2$ of vector element 24A (FIG. 4). A signal then appears at the output $S_{90}$. This signal sets the bistable circuit $B_1$ of vector element 23A connecting with terminal $E_{90}$ of point element 13A. The $B_1$ circuit of vector element 25 will also be set due to the signal appearing at the $S_{180}$ output of logic circuit 13A. The signals at $E_{90}$ of point element 13A and $C_{90}$ provide an output at $S_{180}$.

In a similar manner, all not inhibited circuits, for example the bistable circuit $B_2$ of vector element 18A energize the input $E_{90}$ of the next logic circuit, for example, 14A to provide with the $C_{90}$ signal, a signal at the $S_{180}$ output to set the bistable circuit $B_1$ of the vector element at 90° therewith, for example 25B. However, and as determined by the orientation of the vectors 101–104 of the unit A (FIG. 10), as read into the matrix by the input unit AA, the $B_2$ circuits of vector elements 19, 22, 25 are inhibited over terminal 30. A subsequent application of the $T_1$ signal from trigger circuit $M_3$ of the clock H thus will not cause the associated $B_2$ circuits of vector elements 19, 22, 25 to be set.

Subsequent to the application of the $T_2$ signal which sets the $B_1$ circuits in vector elements 23A and 25B, the RAZ $B_2$ signal is generated by the trigger circuit $M_2$ in response to the application thereto of the $T_2$ signal. The RAZ $B_2$ signal, over terminal 41 and OR-gate 38, resets all the $B_2$ circuits that were set upon application of the MEM $B_2$ signal when the vector configuration was first recorded in the matrix. The trigger circuit $M_3$, in response to the application thereto of the RAZ $B_2$ signal generates the $T_1$ signal which is applied to the terminal 27 of the AND-gates gates P of the vector elements. Only those AND-gates P which have their second input energized from circuit $B_1$, that is vector elements 23A and 25B will propagate a signal to circuit $B_2$ from their set $B_1$ circuits. In consequence, only the $B_2$ circuits of the vector elements 23A and 25B will remain set.

The $T_1$ signal is applied to the trigger circuit $M_4$ of the clock H to generate the final signal RAZ $B_1$ in the comparison cycle. The signal RAZ $B_1$ is applied to the reset terminals 26 of all $B_1$ circuits in the vector elements but since only the $B_1$ circuits in vector elements 23A and 25B as well as those in vector elements 25 and 19 have been set, only these will be reset by the application of the RAZ $B_1$ signal. Additionally, the signal RAZ $B_1$ is applied to OR-gate 49 and AND-gate 51 to control a new cycle.

At the end of the comparison cycle, only those bistable circuits $B_2$ of the vector elements corresponding to the vectors 102 and 104 remain triggered; in the example the $B_2$ circuits of vector elements 23A and 25B. This indicates that the unit B has been found twice in the unit A; the memorized vector elements (i.e. those vector elements in which the $B_2$ circuits remain set after the comparison operation) corresponding to the vectors 102 and 104, the latter represent the last vector 106 of the unit B.

If the programmer PB stores information of a more complex vectorial representation than that shown in FIG. 11, the programmer PB issues a signal at the end of the comparison cycle which is applied to the AND-gate 51 which receives the RAZ $B_1$ signal via OR-gate 49. Both inputs of the AND-gate 51 being energized cause a signal to be applied to the trigger circuit $M_1$ of the clock H to repeat the comparison cycle.

When, in the operation described above, the unit B has been totally described, the last series of signals emitted by the clock is followed by a signal denoting the end of the comparison cycle. The signal from the programmer PB to AND-gate 51 is removed, and the clock H (circuits M1–M4) will stop The signal denoting the end of the comparison cycle delivered by the programmer PB may be used for triggering the second operation of the device, namely that of displaying the identified vectors. During this second operation, a comparison operation takes place in a reverse direction from points of departure constituted by the two points (end of the vectors 102 and 104) of arrival of the comparison cycle previously described.

During the display operation, the succession of changes in orientation controlled by the programmer PB is derived from that programmed in for the comparison cycle, firstly, by defining the changes in orientation of the vectors 105, 106 in reverse order, and secondly by modifying the changes so as to alter each orientation defined by 180°.

Thus, during this second operation, signals from the terminals 44 for each vector unit are obtained. These signals are applied to terminals 44 over OR-gate 43 sensing the resetting of the previously set $B_2$ circuits as the signals, defining a comparison cycle in a reverse order to the preceding comparison cycle, are applied by the programmer. Thus, signals representing the particular vector units, and thus the coordinates of the points of coincidence between the units A and B are obtained.

COMPLEX UNITS

The vectorial representations of units A and B can, of course be more complex than those shown in FIGS. 10 and 11. If, after a comparison cycle is completed, there remains no vector element memorized in the unit A stored in the matrix, then the unit B is not a subunit of unit A. Also if there remains one memorized vector element, the unit B exists once in the unit A and this vector element corresponds to the last vector of the unit B. Furthermore, if there remain a plurality of memorized vector elements, the unit B exists several times in the unit A, these memorized vector elements each corresponding to the last vector of the unit B.

DISCONTINUOUS UNITS—FIG. 13

The units A and B have up to the present time been considered as an uninterrupted succession of vectors. In fact, this condition is not necessary; it is sufficient to eliminate the inhibition signals applied to the vector elements during a predetermined clock time in order to permit the propagation of signals representing fictitious vectors and thus complete a discontinuous unit B.

Figure 13:
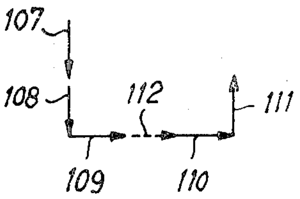
FIG. 13 shows a unit B formed by two successions of vectors.

FIG. 13 shows such a unit B formed by two successions of vectors. The first succession of vectors 107, 108, 109 is shown connected to a second succession of vectors 110 and 111 by a fictitious vector 112. A discontinuous unit B is generally completed by fictitious vectors so as to fall within the case studied previously. These fictitious vectors do not necessarily fall in the pattern of unit A; hence the necessity of eliminating the inhibition of all the vector elements of the matrix during a cycle of the signals defining each of the fictitious vectors.

This removal of inhibition signals is controlled by the programmer PB which applies a signal to the generalization control terminal 40 (FIG. 7). The AND-gates 37, the two inputs of each of which were activated by the inverters 36 and 39 before the application of a generalization signal at 40 and which consequently maintained the bistable circuits $B_2$ of the vector elements not set because the respective memory elements $B_3$ were not set, will remove the inhibition from the bistable circuits $B_2$ since the application of a signal at 40 causes the activating signals delivered by the inverter 39 to disappear.

If there are several ways of completing the unit B, all the combinations are acceptable, on the condition that they do not use vectors situated outside the matrix, or coordinate frame in which the unit A is inscribed. The coordinate frame thus corresponds to the dimensions of the matrix of FIGS. 1, 3. In fact, if such fictitious vectors were chosen outside of the circuits of the matrix, it is obvious that the comparison cycle would not be able to proceed.

Figure 14:
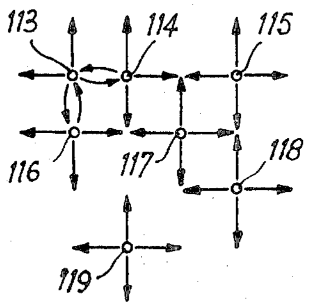
FIG. 14 illustrates the representation of a plurality A of points by a vector unit.

The units A and B need not be defined by a plurality of vectors, but by a plurality of sets of points. FIG. 14 shows a set A of points 113 to 119. This set of points is transformed into a unit by establishing in a reference coordinate system, in short, in a reference frame all the vector elements whose origin corresponds to a point of this set.

Figure 15:
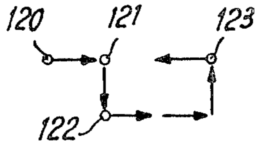
FIG. 15 illustrates the representation of a plurality B of points by a vector unit.
Figure 16:
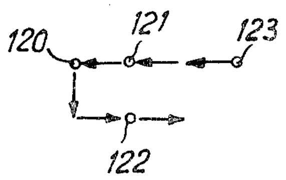
FIG. 16 shows another way of producing a vector representation of the plurality of points shown in FIG. 15.

Similarly, the set B of FIG. 15, less complex than the set A, is transformed into an assembly of successive vectors (using additional fictitious vectors if necessary) such that all the points 120 to 123 of this set correspond to the origins of the vectors of the assembly. FIG. 16 shows another way of producing an uninterrupted series of vectors.

In order to verify the existence of the last point of the unit B, a supplementary vector is provided, which will preferably be chosen to be orientated at 180° with respect to the last vector, so as not to risk leaving the reference coordinate system, and whose origin is at the arrival point of the last of the succession of the vectors which has been constructed. This unit B will be stored, as before described, by signals delivered to, and then by the sequencing unit PB, causing the inhibition of those vector element circuits of the matrix array during the cycling of signals, which correspond to the fictitious vectors of the unit B.

Figure 8:
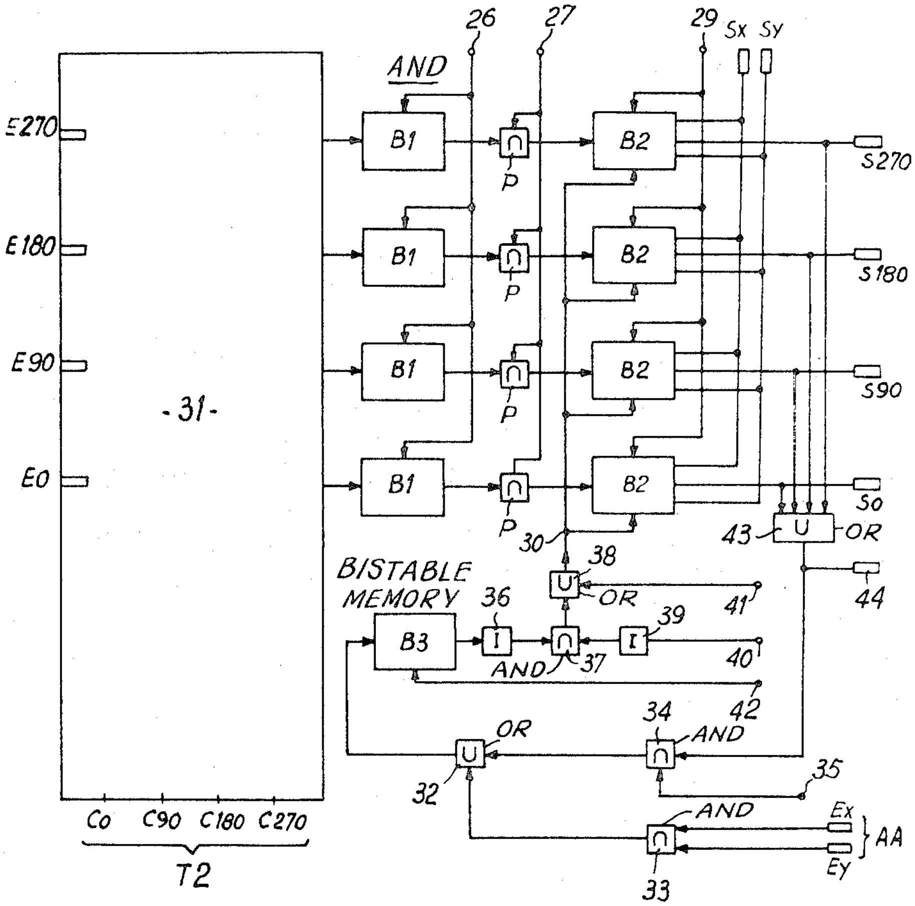
FIG. 8 shows a modification of the identification system of FIG. 6 in the case where the structures to be compared comprise a plurality of points.

When the identification system has to treat only problems of identifying correspondence, in part, of sets of points, it is possible to simplify the system as shown in FIG. 8. All the vector elements whose origins correspond to a point of the unit A are recorded in the reference matrix. The four vector elements originating from the same logic circuit representing a point element simultaneously receive the signals coming from the clock H and the input-output-display device AA. The setting of a single bistable $B_3$ circuit is then indicative that the associated point element is a point in the set of points in unit A.

The reset terminals 26 of all the bistable circuits $B_1$ of any one vector element are connected in common (FIG. 8), as are the terminals 27 of AND-gates P. Common terminal 27 has the signals $T_1$ applied from the clock H. The bistable circuits $B_2$ have a common memory terminal 29 and a common terminal 30, connected both to the terminal 41 for resetting the bistable circuits $B_2$ and to the input-output device AA.

Figure 9:
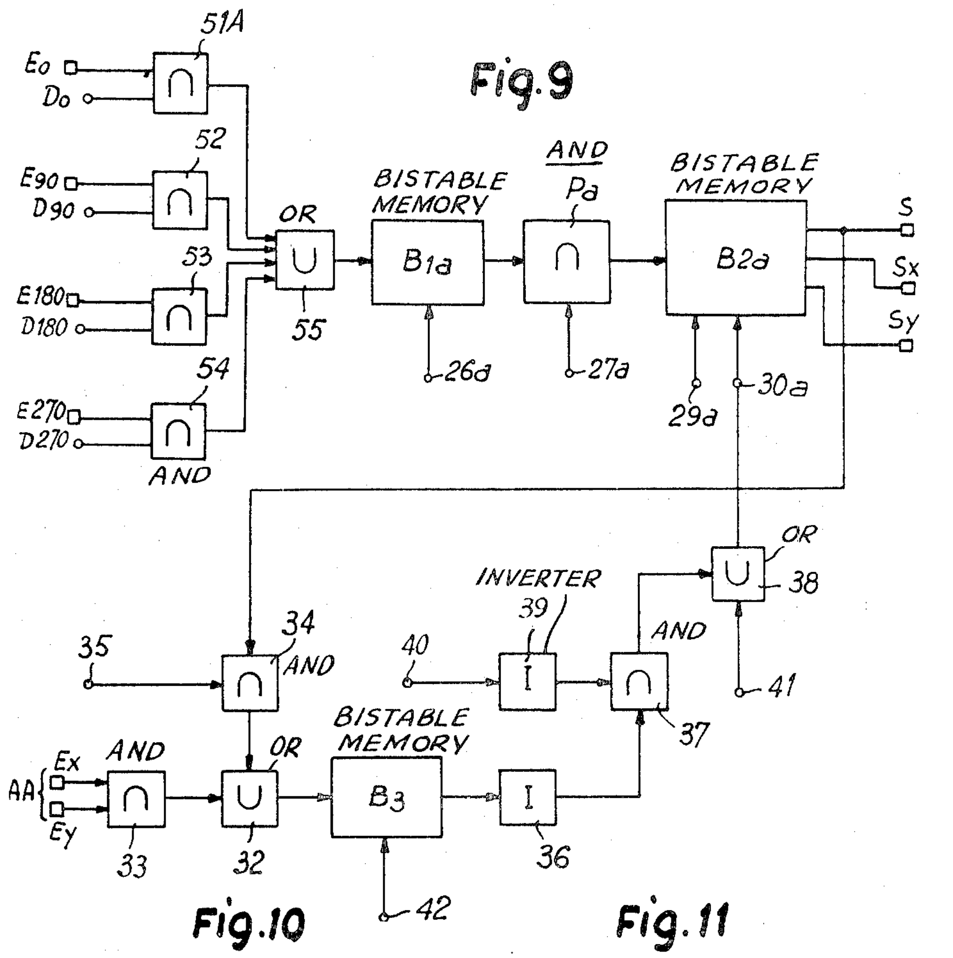
FIG. 9 shows a further modification of the identification device of FIG. 6 in the case where the orientation of a unit B in a unit A is known.

If the orientation of the unit B with respect to that of the unit A is known, then the identification system is much simplified (FIG. 9). Identification need no longer be started in all directions at the same time. Terminal S of unit $B_{2a}$ is connected to the successive logic circuit in the following manner; to the $D_0$ terminal of AND-gate 51A for the adjacent logic circuit situated in the direction at 0°, and, successively, to the $D_{90}$, $D_{180}$ and $D_{270}$ terminal of AND-gates 52 to 54 for the three adjacent logic circuits situated respectively in the directions at 90°, 180° and 270°.

As the succession of signals (FIG. 12) sent by the clock H takes place, each logic circuit will allow triggering of the bistable circuit $B_{2a}$ of the associated logic circuit provided that on the one hand the order of direction change ($D_0$ or $D_{90}$ or $D_{180}$ or $D_{270}$) is applied to the gates 51A or 52 or 53 or 54 of this associated logic circuit which has a signal on the $E_0$ or $E_{90}$ or $E_{180}$ or $E_{270}$ input and that on the other hand the bistable circuit $B_{2a}$ is not inhibited.

It must be noted that the orders of changes in orientation $D_0$, $D_{90}$, $D_{180}$ and $D_{270}$ are determined by the known orientation of unit A with respect to the unit B, each being oriented with respect to a common reference axis.

APPROXIMATIONS

It may be advantageous in certain cases to identify not only strict homomorphies but also approximate homomorphies.

A first approximation may be made concerning the position of the points of the unit A, this being obtained by a procedure of extension.

All the identification systems and devices described and shown above then have an input terminal 35 (FIG. 7) known as an extension terminal.

During the recording and storing of the unit A in the matrix by the display device AA, the existence of each point of the unit A can be extended to all adjacent points by commanding a step in all directions from each point of the unit A by means of the bistable circuits $B_1$ and $B_2$ or $B_{1a}$ and $B_{2a}$. Then, by means of AND-gate 34, and a signal on terminal 35, all the memory elements $B_3$ of the vector elements are triggered whose bistable circuit $B_2$ is triggered.

A second approximation relative to the unit B is obtained by a procedure of "expansion" applicable when an ambiguity exists regarding the position of certain points of the unit B. Then, after application of the generalization signal (terminal 40) which permits the progression of the comparison signal to all the logic circuits representing the points of the unit A close to that in question, the four signals for the vector elements at 0°, 90°, 180°, and 270° are sent simultaneously. These signals are able to set the bistable circuits $B_1$ and $B_2$ of these adjacent logic circuits. The next following order of comparison given by the programmer PB will be executed from all these logic circuits. The progression is continued under generalization until the programmer PB signals the existence of a certain point of the unit B whose existence in the unit A must be verified. The generalization signal is then suppressed and only the bistable circuits $B_2$ corresponding in actual fact to elements of the unit A remain set, the other bistable circuits $B_2$ being reset.

This is equivalent to correcting a possible error of a step (or of *n* steps) in any direction. This "expansion" corresponds to a tentative effort to be at an actual point of arrival, one or *n* steps from the theoretical point of arrival.

This process of expansion is slightly disturbed when the actual point of arrival is near one of the edges of the matrix in which the unit A is stored.

It may then be that the theoretical point of arrival, from which the expansion must be effected, is located outside the frame represented by the matrix; at this moment, the actual point of arrival, although in effect existing, will not be retained and the comparison is stopped.

A previous expansion could then be effected about the point of departure before effecting the progression from the point of departure to the theoretical point of arrival; the actual point of arrival would thus be taken into account.

However, the creation of an expansion zone about the point of departure also presents a disadvantage when this point is near an edge of the matrix.

The expansion zone is in fact limited by the edge of the matrix and, after progression, this zone is found to be incomplete around the theoretical point of arrival. One then risks eliminating an actual point of arrival which would be located the limited part, and which would be normally retained if the expansion zone, after progression, had been complete.

This disadvantage is obviated by giving a particular structure to the elements of the matrix known as "marginal" elements. The function of this structure is to reproduce the part of the expansion zone which was limited by the edge of the matrix.

Figure 20:
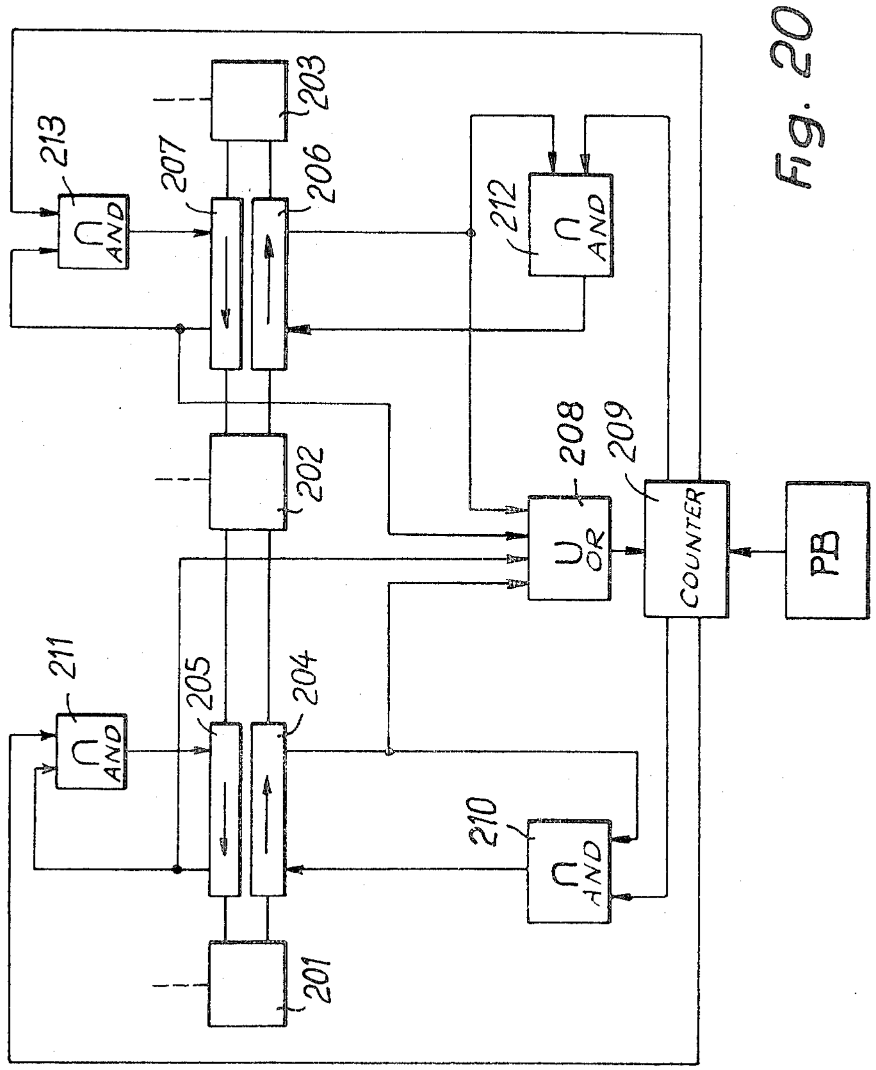
FIG. 20 shows a combination of logic circuits and vector elements including marginal elements for resolving problems of uncertainties.

Such a structure is shown in FIG. 20. This figure schematically shows the edge of a reduced matrix with three logic circuits 201 to 203 and four vector-elements 204 to 207 connecting, in the two possible directions, the three logic circuits 201 to 203.

The outputs of the vector elements 204 to 207 are connected to the inputs of an OR-gate 208.

The output of the OR-gate 208 is connected to the input of a counter 209 known as a "marginal counter" itself connected to the programmer PB.

In addition, there is associated with each of the vector elements 204 to 207 and AND-gate 210 to 213 with two inputs. One of the inputs and the output of these AND gates are respectively connected to the output and the input of the vector element in question, and the second input is connected to the "marginal counter" 209.

Each edge of the matrix is constituted in the same manner and thus comprises a "marginal counter," an OR gate identical to the OR-gate 208, and as many AND gates as the edge comprises vector elements.

The OR-gate 208 delivers a signal as soon as one of the vector elements 204 to 207 has its bistable circuit $B_2$ set.

If, at this moment, the programmer PB gives an order for an outward displacement with regard to the edge of the matrix in question, this order being accompanied by an expansion signal, the output signal of the OR-gate 208 causes the "marginal counter" 209 to advance by one step. This enables the number of expansion steps effected "in the margin" of the matrix, to be counted.

The advance by one step of the counter 209 is effected if the following three events occur simultaneously:

a. At least one bistable circuit $B_2$ is set at the edge of the matrix;

b. An order to progress outwardly beyond the matrix is given;

c. An order of expansion is given.

Once the expansion is effected, the programmer PB begins the sequence defining the following progression.

When this progression is inward with respect to the edge in question, one of the two inputs of the AND-gates 210 to 213 is actuated by means of the counter 209, AND-gates 210, 213 bring about the reactivation of the vector-elements in question, by returning the output signal, which feeds the second input of the AND-gates 210 to 213 to their own input.

This validation is controlled by the "marginal counter" 209 when the latter moves back by one step, this recession by one step being effected every time that the following three events take place simultaneously:

a. An order to progress inwardly is given;

b. An order of expansion is given;

c. State of the counter other than zero.

Thus, when, during a progression, two steps of marginal expansion have brought about the advance movement of the "-marginal counter" 209 by two steps, there will be, in the following progression, provided that all the conditions are fulfilled, a reactivation, lasting two steps, of the edge vector elements whose bistable circuits $B_2$ have been set during the preceding progression.

A third advantageous approximation technique is in ascertaining whether the unit B is contained in the unit A without necessarily utilizing all the vectors or points representing the two units.

During the scanning operation, at time $T_1$ and before the signal RAZ $B_1$ for resetting the bistable circuits $B_1$ occurs (FIG. 12), it is possible to detect the absence of any bistable circuit $B_2$ being the set condition by providing a signal on a detection line connected in common to the outputs of all the bistable circuits $B_2$. The indication by this signal of the absence of a set bistable circuit $B_2$ brings about a procedure of generalization before the signal RAZ $B_1$ is emitted. Under these conditions, the activation signal passes from the set bistable circuits $B_1$ into all the associated uninhibited bistable circuits $B_2$.

The signal or this common detection line may be used for acting on a counter so as to enable the process to be effected only for a determined number of times. For this it is sufficient to inhibit by the counter, the approximation control when it has reached this number.

This process of approximation may also be carried out when only a fixed number of bistable circuits $B_2$ has been set. For this, the detection line delivers an indication of approximation under the control of a logic AND gate with threshold detection capability, i.e. delivering an output signal when it has, at least, a predetermined number of its input terminals not energized.

Figure 17:
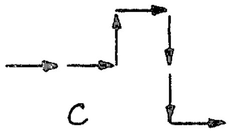
FIGS. 17 and 18 show two similar vectorial representations having a ratio of 1:2.
Figure 18:
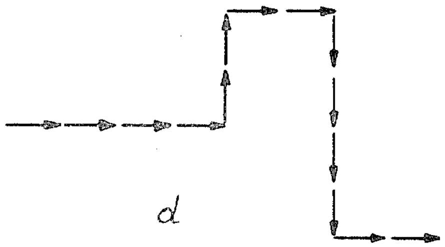

HOMOTHETIC RELATIONSHIP (size transformation—FIGS. 17 and 18

The invention permits detection if there exists in a unit A a subunit identical in shape or pattern to the unit B except for a scale factor, the vector size of the reference frame remaining fixed. FIGS. 17 and 18 represent two similar assemblies in such a relationship having a size ratio of 1:2.

To pass from the description of the unit *c* (FIG. 17) to that of the unit *d* (FIG. 18) an identical vector following each vector of the unit *c* must first be constructed.

By analogy, for any whole integer *n* relationship, a second network which is similar to a first network, in the scale relationship *n*, can be constructed.

Figure 19:
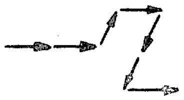
FIG. 19 shows a unit which has a one-to-one correspondence with the vector representation shown in FIG. 17.

SKEW IDENTIFICATION—FIGS. 17 and 19

Two units A and B can be located with respect to different coordinate systems between which there exists a definite relationship. The transformation of the relationships which enables passage from the locating system of the unit B to the locating system of the unit A is applied to the description of unit B. Thus, FIG. 19 shows an assembly of vectors which have, with the assembly of FIG. 17, a one-to-one relationship; these assemblies can be studied with respect to one another as if there were identity of the reference systems.

Of course, the present invention is not limited to the above described and shown embodiments. In particular it is possible to use a reference system with more than two dimensions, in which case the vector elements remain the same. The point elements become more complicated sin the number of vector elements for which they will be the origin and the terminal end will be larger; there will be a different number of possible changes in orientation.

Similarly, the reference system and the matrix may be any coordinate system and may assume the form of a number of interrelated squares, a grid, or any tree network adapted to the patterns or structures to be compared.

The vector elements connecting the nodes of the frame may be constituted by any hydraulic, pneumatic, electric or other circuits operating with the form of logic previously described.

This invention is derived from the "adaptable and active memory device with unlimited capacity" described in French Pat. No. 1,381,212 of the 30th Sept. 1961 in the name of M. Jacques Sauvan, in the sense that it is possible to progress step by step in an active memory without fixing an aim, from all the positions in the memory which are considered as points or vectors of the unit A, by fixing for each step in each center of association of action a single component vector.

The resultant vector thus determined at each cycle or step by the set of the vectors, constitutes a step in the description of the unit B. The programmer PB is used in this case for reading in data representative of vectors B, in progression by applying the corresponding component vector at each step.

The number of elements, and interconnections in the matrix will depend on the type of patterns to be recognized, and the resolution, or fineness required. As an example, typed or printed letters of the Roman alphabet can be recognized by matrices having 16×12 nodal points without ambiguity. To recognize Chinese characters, matrices of 60×60 nodal points will be necessary. For fingerprint recognition, matrices of 80×60, or more nodal points are required. Matrices of at least 400×400 nodal points are desirable to correlate information derived from physical processes, such as bubble chambers, and the like, with photographs of previously established similar processes, and to effect comparisons.

Figure 5:
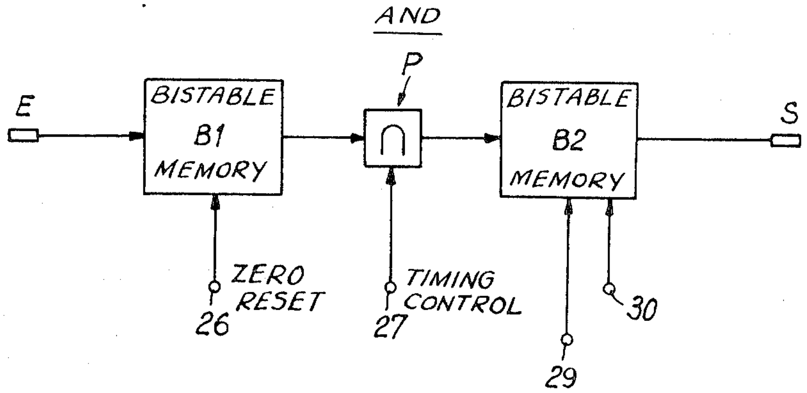
FIG. 5 shows the components forming the vector elements interconnecting the logic circuits of the matrix shown in FIG. 3.

I claim:

1. A method of identifying similarities between patterns forming vector systems in which a second vector system (unit B) is compared with a larger first vector system (unit A), each system being composed of a set of point units, or set of vectors, within a predetermined reference system of coordinates, comprising the steps of establishing, in a matrix of logic elements (FIG. 1: 1, 2; FIGS. 4 and 5; FIG. 7: 31, $B_1$, $B_2$, $B_3$) having identifiable states, an analog of said first vector system (A) by placing logic elements corresponding, in the matrix, to the larger first vector system (unit A) in a first state and all other elements in the matrix in a second state;

generating signals (FIGS. 6, 7: PB; $C_0$, $C_{90}$, $C_{180}$, $C_{270}$) representing the angular changes in orientation between successive vectors in a vector path of said second system (B), said signals having characteristics indicative of said angular change;

said characteristics further controlling propagation through the logic elements and permitting passage through those logic elements, only, which are in a first state;

applying ($M_1$; PB) said signals to said logic elements;

interrupting sequential application of said signals to the elements in the matrix upon failure of passage of the signals, indicative of similar change of orientation of vectors of both vector systems;

and determining those logic elements of the matrix through which passage of signals prior to interruption of sequential comparison occurred.

2. Method according to claim 1, including the step of overriding signal characteristics indicative of reversal of direction of vectors, or direction of sequential points of coincidence, between the states of the elements representing the analog representation of said first vector system (A) and the signals representative of the second vector system (B).

3. Method according to claim 1, wherein said matrix of logic elements comprises a first group of logic elements (FIG. 4; FIG. 6: C) representative of nodal points in the matrix and a second group of logic elements (FIG. 5; FIG. 7: $B_1$, $B_2$) representing interconnecting vectors between said nodal elements;

and said step of generating said signals representing angular change in orientation includes the step of applying timing signals to said nodal elements and controlling, by said signals representing the angular change in orientation, the propagation of said timing signals through said nodal elements to specific logic elements, in accordance with the angular change in orientation commanded by the characteristics of said signals.

4. Method according to claim 1, wherein said second vector system (B) is formed of a plurality of noncontiguous vectors, including the stop of generating signals representative of fictitious vectors having characteristics to provide a unique sequential succession of signals representing a continuously traceable succession of vectors, and a sequential description of the paths defined by said second vector system (B).

5. Method according to claim 1, wherein said points during storing are referred to an arbitrary base point and coordinate system within said reference system.

6. Method according to claim 1, wherein the step of sequentially comparing the paths each defined by the succession of vectors of said second vector system (unit B) with the vectors of said first vector system (unit A) includes the step of generating a scanning signal which progresses, in a predetermined number of sequential steps, in all coordinate directions within said reference system from points of units through which said signals passed in an immediately preceding sequence of signals;

and generating a verification signal upon coincidence of vectors or points of said second (unit B) with said first (unit A) vector system.

7. Method according to claim 1, including the step of counting the number of $n$ coincident logic elements representative of $n$ coincident vectors or points by detecting, upon each comparison step, the number of elements common to said two units, whereby the degree of homomorphy of said two units A and B may be determined.

8. Method according to claim 1, including the step of serially combining logic elements of coincident orientation to change the scale of one of said two units, whereby said vector systems (units A and B) may be compared with respect to different reference systems having correlation therebetween.

9. Method according to claim 1 including the steps of counting signals appearing at the unconnected terminals of the logic elements representative of said vector systems whereby the number of vectors in the system located beyond the reference coordinate system can be determined and an approximation of homomorphy between systems obtained.

10. System to identify similarities between patterns comprising a matrix (FIGS. 3, 6; FIG. 7) of logic circuit elements capable of assuming alternate states (FIG. 4; FIG. 5; FIG. 7), said matrix having at least two dimensions and including nodal logic circuits (FIG. 4) representative of nodal points within a coordinate system and connecting logic circuits (FIG. 5) representative of directions of vectors interconnecting said nodal points;

means (FIG. 7: AA; $E_x$, $E_y$; 33, 32, $B_3$, 36, 37, 38, 30) setting selected connecting logic circuits to a first state, to form an analog pattern within said matrix of a first vector system (A);

means (PB) generating signals representative of vector orientation of a second system of vectors (B) to be compared with said first vector system (A), said signals having characteristics sensing the state of the connecting logic circuits connected thereto and enabling propagation of said signals through those logic elements which are in the first state, while being blocked from passage through those logic elements which are in the second state;

means ($M_1$; 45, 46, 47, 48; $M_2$, $M_3$, $M_4$) sequentially applying said signals sensing the state of said logic elements to all said logic elements within said matrix;

and means identifying those of the logic elements in the matrix responding to said sensing signals to identify those logic elements within the first vector system (unit A) which include vectors of orientation of the second vector system (unit B) to thereby identify similarities between patterns as represented by vector systems.

11. System according to claim 10, wherein said nodal elements have terminals representative of vector orientation in directions within a coordinate system and corresponding to said matrix;

said connecting logic circuits being connected in their respective vectorial direction, within the matrix, to said output terminals;

and said means generating signals representative of vector orientation comprises means applying signals to all said nodal logic circuits and controlling the activation of the output terminals at the nodal logic circuits in accordance with the change in direction representative of vector orientation of the second system of vectors (unit B), whereby those of said connecting logic circuits set to said first state, and propagating said signals, upon change of direction, will have passed only signals representing the second vector system (unit B) which is contained in unit A.

12. System according to claim 10, including counter means counting the number of times said signal representative of vector orientation of the second system of vectors passes through a logic circuit set in a first state and corresponding to said vector representing said first system of vectors.

13. System according to claim 10, wherein said connecting logic circuits comprises conductor elements connecting said nodal logic circuits together in a matrix array, two adjacent nodal logic circuits being connected together by a pair of unidirectional connecting logic circuit elements passing signals in opposite directions to represent vectors oriented in reverse direction, whereby said circuit will be an analog of a flat frame having a flat rectangular series of squares whose nodes are constituted by nodal logic circuits.

14. System according to claim 10, wherein said nodal logic circuits (FIG. 4) are constituted by four lines and four times four AND gates, each having two inputs, the first of which are connected to outputs of connecting logic circuits and the second of which are connected to said means (PB) generating signals representative of change in vector orientation; the outputs of said AND gates being connected to inputs of said connecting logic circuits representing vectors departing from the point element in question.

15. System according to claim 10, wherein said connecting logic circuits (FIG. 5) are constituted by a circuit successively comprising;

a first bistable memory, (B1), and AND-gate (P) and a second bistable memory (P2).

16. System according to claim 15, wherein said means setting selected connecting logic circuits (FIG. 7) include a memory element (B3) associated with each of said second bistable memories (B1) of the connecting logic circuits;

said memory element (B3) having an input, an AND-gate gate connected to said input, said AND-gate (32) comprising two inputs corresponding to the two locating coordinates (Ex, Ey) of the vector element to be stored, the output of said memory element (B3) activating or inhibiting the second bistable memories (B2).

17. System according to claim 15, wherein the means sequentially applying the signals sensing the state of the logic elements and representative of vectors in the reference system comprises a clock associated with a device sequentially applying signals to terminals of the nodal logic circuits in accordance with the orientation of the vectors of the second system, said clock comprising four monostable trigger circuits (M1, M2, M3, M4), in series, delivering cyclically and successively:

a. a signal applied to said means (PB) generating signals representative of direction of orientation;
b. a signal for resetting said second bistable memories (B2) of said connecting logic circuits to zero;
c. a signal for enabling the AND-gate (P) of said connecting logic circuits; and
d. a signal for resetting said first memories (B1) of said connecting logic circuits to zero.

18. System according to claim 16, including counting means (43, 44) counting the number of times that the second bistable memories (B2) change state upon application of a clock signal thereto;

and means (44) displaying the connecting logic circuits representative of the points of vectors having coincidence with the system set into the matrix.

19. System according to claim 18, wherein said counting means includes an array of OR gates (43) with four inputs, one for each connecting logic circuit connected to a nodal logic circuit;

each of said OR gates (43) being supplied by said second bistable memories (B2) of said four connecting logic circuits issuing from a nodal logic circuit and delivering an indicating signal (44).

20. System according to claim 14, wherein the connecting logic circuits (FIG. 5, FIG. 8) representative of vector elements connected to a point logic element comprise:

a common input (26) for returning said first bistable memories (B1) to zero;

a common input (27) for controlling said AND-gates P;

a common input (29) for activating, for storage, of said second bistable memories (B2);

and a common means (38) activating or inhibiting the second respective bistable memories (B2) of the four connecting logic circuits simultaneously.

21. System according to claim 10, wherein each point nodal logic circuit (FIG. 4) comprises a matrix of 4×4 AND-gates (P1–P16) having a clock input and a direction input, each;

each connecting logic circuit (FIG. 5) comprises, in series, a first bistable memory (B1) having its input connected to an output of a nodal logic circuit, an AND-gate (P) and a second bistable memory (B2) capable of being activated or inhibited;

the outputs of the second bistable memories (B2) being connected to a corresponding input, each, of the four adjacent nodal logic circuits.

22. System according to claim 21, further including a marginal circuit (FIG. 20), said marginal circuit comprising an OR-gate 208 having inputs connected to the outputs of the second bistable memories (B2) of the connecting logic circuits at the edge of the matrix;

a counter (209) having its input connected to the output of the OR-gate (208), said counter being connected to said means (PB) generating signals representative of vector orientation;

AND-gates (210, 211, 212, 213), one each associated with one of the connecting logic circuits representative of vector direction, the outputs of said AND gates being connected to the inputs of the first bistable memory (B1) of an associated connecting logic circuit, and having one input derived from the output of the second bistable memory (B2) of said associated connecting logic circuit and a further input derived from the output of said counter (209), whereby representation of vectors falling in a reference system beyond that represented by the matrix, will be counted.

23. System according to claim 10, wherein said nodal logic circuits are connected to four connecting logic circuits, each representing an angular orientation of 0°, 90°, 180° and 270°.

24. Method according to claim 1, further including displaying the results of the identification by reversing the order in which the angular changes in orientation of the vectors representing the second pattern are generated;

modifying the generation of each signal to represent each defined angular change plus 180°; and sequentially applying the modified signals to said elements to provide signals indicating the number of times the second pattern exists in the first pattern, the first modified signal being applied to said final element.

25. Method according to claim 1, in which the second pattern is discontinuous and its vector representation is made continuous by including fictitious vectors, the method further including generating a signal representing the angular change in orientation between the last vector representing the first part of the second discontinuous pattern and a fictitious vector; and generating a signal representing the angular change in orientation between said fictitious vector and the first vector representing the second part of the second discontinuous pattern so that the sequential application of said generated signals to said elements is not interrupted.

26. System of identifying similarity between patterns forming vectors in a reference system comprising a matrix of interconnected elements, each element including means (B2) for storing a signal representative of a vector in a first pattern;

means (PB) coupled to said elements for generating first signals representing the angular changes in orientation between successive vectors in the vector path forming said second pattern and applying said first signals to said elements to cause a second signal to be passed from an element to which the first signal is applied to an adjacent element in the matrix; and means (B7–B2) storing a signal representing a vector in the first pattern which is angularly oriented with respect to the preceding vector in said first pattern by an angle represented by the applied first signal.

27. System according to claim 26, in which said elements each include four vector circuits, each connected to a different one of four adjacent elements located in the matrix at positions representing an angular orientation of 0°, 90°, 180° and 270° to the element from which said vector circuits emanate, and in which said storage means includes a storage member within each vector circuit.

28. System according to claim 26, in which each element includes a vector circuit connected to each of four adjacent elements located in the matrix at positions representing an angular orientation of 0°, 90°, 180°, and 270° to the element from which the vector circuit emanates, and said storage means includes a storage member in a vector circuit.

29. System according to claim 26, in which each storage member includes a setting bistable circuit (B3) settable to represent a vector point in said first pattern.

30. System according to claim 29, in which each vector circuit includes a first bistable circuit (B1) settable by a signal passed from another element to which the element including said vector circuit is connected to provide a first output signal, and AND-gate (P) energizable by said first output signal, and a second bistable circuit (B2) settable in response to said first output signal being passed through said AND-gate (P) to provide a second output signal for application to the dement or elements to which the vector circuit is connected.

31. System according to claim 30, including means (33, 32; 36, 37) for inhibiting the setting of the second bistable circuit (B2) so that only those second bistable circuits can be set which are included in vector circuits representing a vector in said first pattern.

32. System according to claim 26, in which each element includes a plurality of AND gates (FIG. 4: P1–P16) whose inputs are connected to said first signal generating means (PB) and to the outputs (FIG. 4: E) of the vector circuits emanating from adjacent elements, the outputs from said AND gates being connected to the input or inputs (FIG. 5: E) of the element's vector circuit or circuits.

33. System according to claim 30, including timing means (FIG. 7: M1–M4) for applying timing signals to said first signal generating means (PB) and said vector circuits to control the sequential application of said first signals to said elements, the setting of the first (B1) and second (B2) bistable circuits and the energization of the AND-gate gate (P) which allows said first output signal to pass to said second bistable circuit.

34. System according to claim 26, in which said matrix comprises a two-dimensional matrix of electronic elements.

35. System according to claim 31, including (FIG. 20) a counter (209) coupled to the second bistable circuits (B2) for counting the number of time uninhibited second bistable circuits are set by said first output signals during the sequential application of said first signals, and means responsive to a predetermined count in said counter to stop further sequential application of said first signals.

36. System according to claim 35, including a marginal circuit formed by an OR-gate (208) whose inputs are connected to the outputs of the second bistable circuits of the vector circuits on the edge of the matrix, and whose output is connected to a counter (209), said counter being connected to the first signal generating means (PB), and said marginal circuit further includes AND-gates (210, 211, 212, 213), each associated with a different one of the vector circuits that are coupled to said OR-gate (208), each AND gate having its output and one of its inputs connected respectively to one of the inputs of the first bistable circuit and to the output of the second bistable circuit of its associated vector circuit, and a second of its inputs being connected to the counter (209), whereby the representation of vectors by said vector circuits will be constrained to fall within said matrix.

* * * * *